US011584299B2

(12) United States Patent
Berne

(10) Patent No.: US 11,584,299 B2
(45) Date of Patent: Feb. 21, 2023

(54) DRIVER-ASSISTING SYSTEM FOR AN INDUSTRIAL VEHICLE

(71) Applicant: Volvo Truck Corporation, Gothenburg (SE)

(72) Inventor: Nicolas Berne, Heyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 179 days.

(21) Appl. No.: 16/977,090

(22) PCT Filed: Mar. 5, 2018

(86) PCT No.: PCT/EP2018/055360
§ 371 (c)(1),
(2) Date: Aug. 31, 2020

(87) PCT Pub. No.: WO2019/170219
PCT Pub. Date: Sep. 12, 2019

(65) Prior Publication Data
US 2020/0406819 A1 Dec. 31, 2020

(51) Int. Cl.
*B60R 1/02* (2006.01)
*B60K 37/06* (2006.01)

(52) U.S. Cl.
CPC ............... *B60R 1/02* (2013.01); *B60K 37/06* (2013.01); *B60K 2370/12* (2019.05);
(Continued)

(58) Field of Classification Search
CPC . B60R 1/02; B60R 2300/105; B60R 2300/20; B60R 2300/30; B60R 2300/802;
(Continued)

(56) References Cited

U.S. PATENT DOCUMENTS 9,637,064 B1\* 5/2017 Kuehnle ............... H04N 5/2253
10,000,155 B2\* 6/2018 Schrepfer ............... B60R 11/04
(Continued)

FOREIGN PATENT DOCUMENTS

| EP | 1550580 A1 | 7/2005 |
| WO | 2006/093073 A1 | 9/2006 |
| WO | 2017/138866 A1 | 8/2017 |

OTHER PUBLICATIONS

International Search Report and Written Opinion for international application No. PCT/EP2018/055360, dated Sep. 4, 2018, 10 pages.

*Primary Examiner* — James M Pontius
(74) *Attorney, Agent, or Firm* — Withrow & Terranova, PLLC

(57) ABSTRACT

A driver-assisting system for an industrial vehicle comprising: a first camera mounted on a vehicle cab for viewing an area in front of the vehicle; an image processing unit operatively connected to said first camera for receiving image data from said first camera; a display unit operatively connected to said image processing unit for displaying image to a user based on said image data; a control unit operatively connected to said first camera for modifying operating parameters of said first camera; wherein the first camera is adapted to provide a wide-angle field of vision, and in that the field of vision of said first camera relative to the vehicle can be adjusted by the control unit.

12 Claims, 1 Drawing Sheet

(52) U.S. Cl.
CPC .. *B60K 2370/152* (2019.05); *B60K 2370/167* (2019.05); *B60K 2370/173* (2019.05); *B60K 2370/186* (2019.05); *B60K 2370/21* (2019.05); *B60R 2300/105* (2013.01); *B60R 2300/20* (2013.01); *B60R 2300/30* (2013.01); *B60R 2300/802* (2013.01)

(58) Field of Classification Search
CPC . B60R 2300/605; B60R 2300/70; B60R 1/00; B60K 37/06; B60K 2370/12; B60K 2370/152; B60K 2370/167; B60K 2370/173; B60K 2370/186; B60K 2370/21
See application file for complete search history.

(56) References Cited

U.S. PATENT DOCUMENTS

| | | |
|---|---|---|
| 2006/0125919 A1 | 6/2006 | Camilleri et al. |
| 2006/0170771 A1 | 8/2006 | Chien et al. |
| 2014/0313335 A1* | 10/2014 | Koravadi ........... H04N 5/23216 348/148 |
| 2015/0055120 A1 | 2/2015 | Le et al. |
| 2015/0146000 A1* | 5/2015 | De Wind ............... B60K 37/06 348/148 |
| 2021/0213877 A1* | 7/2021 | Petrillo ................ B60Q 1/0023 |

* cited by examiner

DRIVER-ASSISTING SYSTEM FOR AN INDUSTRIAL VEHICLE

This application is a 35 USC 371 national phase filing of International Application No. PCT/EP2018/055360, filed Mar. 5, 2018, the disclosure of which is incorporated herein by reference in its entirety.

TECHNICAL FIELD

The invention relates to a driver-assisting system for an industrial vehicle.

The invention can be applied to several industrial vehicles, such as trucks, buses and construction equipment.

BACKGROUND

Many industrial vehicles, in particular trucks, currently employ rear-view and side-view mirrors to enable the driver to see rearward or on the sides, for example, to detect obstacles at the left or right side and at the rear. However, it is not always possible to see hidden areas or blind spots using such rear-view and side-view mirrors. Thus, in addition to these rear-view and side-view mirrors, many industrial vehicles are also equipped with video cameras to help the driver to see blind spots at the rear or at the sides. Furthermore, to assist the driver when maneuvring or parking, many industrial vehicles may be equipped with a video camera mounted on a vehicle cab, said camera providing images of the area extending in the immediate proximity of the bumper of the vehicle. This type of camera is referenced as a class VI camera when the requirements defined in the Regulation UN ECE n° 46 are complied.

Today, class VI cameras are only used to help driver to see better what is on the road at a distance of up to two meters from the bumper of the vehicle. Due to the fixed orientation of the class VI cameras relative to the vehicle cab, it is not possible to view other surrounding areas of the vehicle with such class VI cameras. Furthermore, class VI cameras are controlled to operate only when the speed of the vehicle is low, in particular lower than 15 km/h. Thus, when the vehicle is moving faster than 15 km/h, the camera stops filming.

Considering that the drivers of industrial vehicles would be interested by driving-assistance systems to help them both when manoeuvring and parking at low vehicle's speed, and when driving in bad environment conditions, for example during the night or when it is raining, at medium or high vehicle's speed, the current class VI cameras imperfectly meet the needs of the drivers.

SUMMARY

An object of the invention is to provide a driver-assisting system for an industrial vehicle, which system permits to optimize the use of a camera mounted at a front part of the vehicle for other purposes than those of conventional class VI cameras, and to provide improved assistance to the driver in terms of visibility and safety.

The object is achieved by a driver-assisting system for an industrial vehicle comprising:
- a first camera mounted on a vehicle cab for viewing an area in front of the vehicle;
- an image processing unit operatively connected to said first camera for receiving image data from said first camera;
- a display unit operatively connected to said image processing unit for displaying image to a user based on said image data;
- a control unit operatively connected to said first camera for modifying operating parameters of said first camera;

characterized in that the first camera is adapted to provide a wide-angle field of vision, and in that the field of vision of said first camera relative to the vehicle can be adjusted by the control unit.

Thus configured, the driver-assisting system of the present invention allows the modification of the field of vision of a camera mounted at the front of the vehicle. Thus, the field of vision of the camera may advantageously be automatically changed according to the speed of the vehicle, so that the camera operates as a class VI camera at a speed lower than 15 km/h and as a camera providing an extended field of vision at a speed greater than 15 km/h. This extended field of vision of the camera can thus provide improved visibility to the driver which can see on the display unit the images captured by the camera. The driver can thus see more details on the road even at medium or high vehicle's speed. This advantage may be particularly important when the visibility conditions are low, e.g. in bad weather conditions or at night.

The driver-assisting system may also include one or more of the following features, taken alone or in combination.

According to one embodiment, the control unit is adapted to receive vehicle operating data and to modify the field of vision of the first camera in response to said vehicle operating data.

According to a further embodiment, the vehicle operating data include vehicle speed data.

According to a further embodiment, when the vehicle speed is between 0 and 15 km/h, the field of vision of the first camera is adjusted so that the field of vision of said first camera corresponds to the field of vision of a class VI front-view device according to the Regulation UN ECE n° 46, and, when the vehicle speed is greater than 15 km/h, the field of vision of the first camera is adjusted so that the field of vision of said first camera covers an area that is not covered by a class VI front-view device according to the Regulation UN ECE n° 46.

According to a further embodiment, when the vehicle speed is greater than 15 km/h, the field of vision of the first camera is adjusted so that the field of vision of said first camera covers an area starting from a vertical plane distant from the front of the vehicle by at least 2 meters.

According to a further embodiment, the control unit is adapted to receive input data from manual inputs and to modify the field of vision of the first camera in response to said input data.

According to a further embodiment, the manual inputs are housed in the dashboard of the vehicle.

According to a further embodiment, the system further comprises a second camera mounted on the vehicle for viewing an area at the rear of the vehicle, the image processing unit being operatively connected to said second camera for receiving image data from said second camera.

According to a further embodiment, the image processing unit is adapted to receive vehicle operating data and to selectively transmit image data of the first camera or of the second camera to the display unit in response to said vehicle operating data.

According to a further embodiment, the vehicle operating data include the gear train position.

According to a further embodiment, the image processing unit is adapted to selectively transmit image data of the second camera to the display unit when the reverse gear is engaged.

According to a further embodiment, the image processing unit is adapted to receive input data from manual inputs and to selectively transmit image data of the first camera or of the second camera to the display unit in response to said input data.

According to a further embodiment, the manual inputs are housed in the dashboard of the vehicle.

According to a further embodiment, the image processing unit is adapted to modify image data of the first and/or second cameras depending on environment conditions and/or vehicle operating data.

According to a further embodiment, the control unit is adapted to control an optical zoom of the first and/or second cameras to alter the field of vision of said first and/or second cameras.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
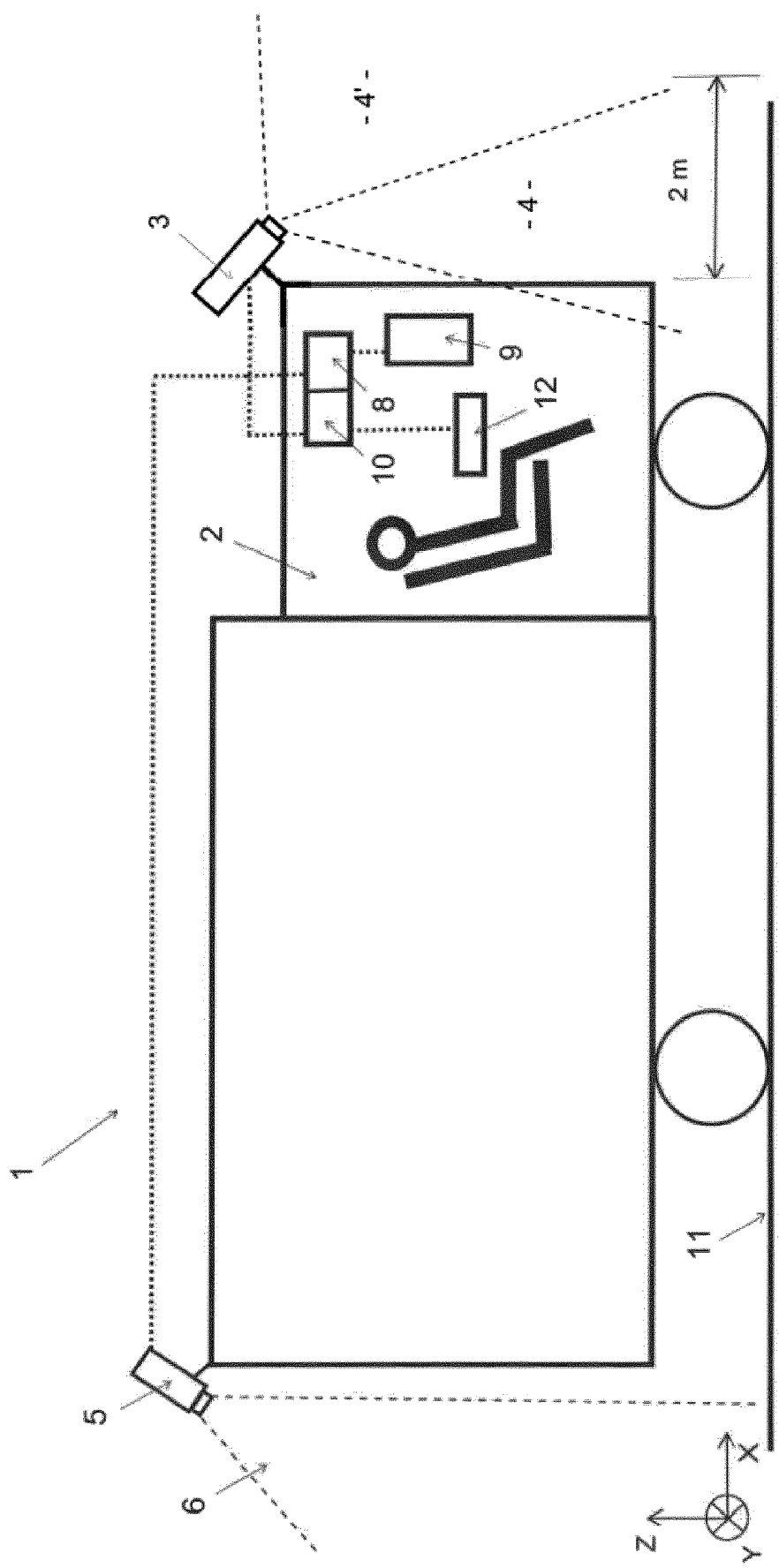
FIG. 1 is a schematic side view of a truck equipped with a driver-assisting system according to the invention.

FIG. 1 shows an industrial vehicle 1, more specifically a truck. Although the invention will be described with respect to a truck, the invention is not restricted to this particular vehicle, but may also be used in other vehicles, such as a bus.

The vehicle 1 comprises a frame supported by front wheels and rear wheels as well as a cab 2 at its front side. The front and rear wheels are in contact with the road 11. As illustrated in FIG. 1, Z is defined as the direction perpendicular to the road 11, X is defined as the longitudinal direction of the vehicle 1, and Y is defined as the transversal direction of the vehicle 1.

The vehicle 1 is equipped with a pair of cameras 3, 5, respectively a front camera 3 mounted on the cab 2 at the front of the vehicle 1 and a rear camera 5 mounted at the rear of the vehicle 1, said cameras 3, 5 capturing images of an area surrounding the vehicle 1 within a respective field of vision 4, 6. The cameras 3, 5 are in communication with an image processing circuit 8 configured to receive image data representative of the captured images from the cameras 3, 5. Advantageously, the image processing circuit 8 is further configured to process the image data received from the cameras 3, 5 before transmitting said image data to a display 9 that is in communication with said image processing circuit 8. The display 9 is configured to display images based on the image data received from the image processing circuit 8 and is advantageously positioned inside the cab 2, in front of the driver.

The image processing circuit 8 may advantageously be configured to modify the image data received from the front camera 3, respectively the rear camera 5, so as to improve the visibility of the driver at the front side, respectively at the rear side, of the vehicle 1. In particular, when the environment conditions outside the vehicle are so bad that they prevent the driver to correctly see the road 11 with bare eyes, the image processing circuit 8 is adapted to provide improved image data to the display 9 so as to confer a good visibility to the driver when looking at the display 9. Such bad environment conditions include for example bad weather conditions, i.e. when it is raining or snowing, or bad time conditions, i.e. during the night. Furthermore, the image processing circuit 8 may advantageously be configured to receive vehicle operating data from sensors (not shown) and to modify the image data received from the cameras 3, 5 depending on said vehicle operating data. In a further advantageous embodiment of the present invention, the image processing circuit 8 is adapted to receive vehicle operating data from sensors (not shown) and to selectively transmit image data of the front camera 3, or of the rear camera 5, to the display 9 in response to said vehicle operating data. In a specific embodiment of the invention, the vehicle operating data include data relative to a gear train position. In particular, when a specific sensor adapted to detect the position of a gear train transmits the information to the image processing circuit 8 that the reverse gear is engaged, the image processing circuit 8 selectively transmits image data of the rear camera 5 to the display 9 so that the driver can only see the rear side of the vehicle 1, thus improving the visibility of the driver during parking for example.

In a further additional embodiment of the present invention, the vehicle 1 may comprise manual inputs 12 mounted inside the cab 2, and preferably housed in the dashboard of the vehicle 1, the manual inputs 12 being in communication with the image processing circuit 8 and with a control circuit 10 (detailed in the following paragraphs). The manual inputs 12 may advantageously comprise a set of buttons or switches, each button or switch corresponding to a specific action or function of the image processing circuit 8 and/or of the control circuit 10. In particular, the manual inputs 12 may be actuated by the driver so as to activate an alteration of the image provided by the display 9. The alteration may correspond to a change in the displayed field of vision by zooming and/or panning the image data received from the cameras 3, 5. The manual inputs 12 may also be actuated by the driver so as to switch the image processing circuit 8 between a first operating mode, in which it selectively transmits image data of the front camera 3 to the display 9, and a second operating mode, in which it selectively transmits image data of the rear camera 5 to the display 9. This manual control of the cameras 3, 5 is only optional in the present invention, the main control of the cameras 3, 5 being done automatically by the control circuit 10 as explained in detail in the following paragraphs.

Advantageously, the front and rear cameras 3, 5 are chosen among wide-angle cameras that are adapted to provide a wide-angle field of vision. In particular, such wide-angle cameras are able to provide a field of vision similar to that of a class IV wide-angle view device according to the Regulation UN ECE n° 46. Thus, the field of vision of a wide-angle camera shall be such that the camera can image at least a 15 m wide, flat, horizontal portion of the road 11, and at a distant of at least 10 m, and preferably at least 25 m, from the front of the vehicle.

The front camera 3 is advantageously controlled by the control unit 10 so that the field of vision of the front camera 3 can be automatically adjusted. The control unit 10 may advantageously be configured to receive vehicle operating data from sensors (not shown) and to modify the field of vision of the front camera 3, depending on said vehicle operating data. In a specific embodiment of the invention, the vehicle operating data include vehicle speed data. In particular, the control unit 10 is adapted to receive speed data from a specific speed sensor and to adjust the field of vision of the front camera 3, so that, when the vehicle speed is between 0 and 15 km/h, the field of vision of said front camera 3 corresponds to the field of vision of a class VI front-view device according to the Regulation UN ECE n° 46, which is illustrated in FIG. 1 by the area 4, and, when the vehicle speed is greater than 15 km/h, the field of vision of said front camera 3 covers an area that is not covered by a class VI front-view device, which is illustrated in FIG. 1 by the area 4'. More specifically, when the vehicle speed is between 0 and 15 km/h, the field of vision of the front camera 3 may advantageously cover a first area starting from the front of vehicle and extending to a vertical plane distant from the front of the vehicle by 2 meters, as illustrated in FIG. 1, and, when the vehicle speed is greater than 15 km/h, the field of vision of the front camera 3 may advantageously cover a second area starting from a vertical plane distant from the front of the vehicle by at least 2 meters. The distance from which starts the second area may of course be different from 2 meters depending on the type of vehicle. In particular, for a truck having a high height, this distance may be greater than 2 meters. Thus configured, the driver-assisting system optimizes the use of the front camera 3 and provides an improved assistance to the driver. Indeed, such an adjustable front camera 3 can assist the driver both when manoeuvring or parking at a low vehicle's speed, and when driving at a medium or high vehicle's speed. In this last case, the driver may take advantage of the wide-angle field of vision of the front camera 3 and of the improved image data provided by the image processing unit, especially when the environment conditions are bad.

It is to be understood that the present invention is not limited to the embodiments described above and illustrated in the drawings; rather, the skilled person will recognize that many changes and modifications may be made within the scope of the appended claims.

In particular, the driver-assisting system of the present invention may comprise further cameras, in addition to the front and rear cameras, to cover other surrounding areas of the vehicle. Said additional cameras, as well as the front and rear cameras, may be configured to capture both images that are visible to the human eye, i.e. corresponding to wavelengths from about 400 to 800 nm, and images that are not visible to the human eye, for example corresponding to an infrared vision. Thus configured, the cameras can provide images to the display unit 9 even if the visibility is not good or sufficient, in particular during the night.

The invention claimed is:

1. A driver-assisting system for an industrial vehicle comprising:
    a first camera mounted on a vehicle cab configured to view an area in front of the vehicle;
    an image processing circuit operatively connected to the first camera, the image processing circuit configured to receive image data from the first camera;
    a display operatively connected to the image processing circuit, the display configured to display an image to a user based on the image data; and
    a control circuit operatively connected to the first camera, the control circuit configured to modify operating parameters of the first camera;
    wherein the first camera is configured to provide a wide-angle field of vision, and the field of vision of the first camera relative to the vehicle is adjustable by the control circuit,
    wherein:
        the control circuit is configured to receive vehicle operating data and to modify the field of vision of the first camera in response to the vehicle operating data;
        the vehicle operating data includes vehicle speed data; and
        when the vehicle speed is between 0 and 15 km/h, the field of vision of the first camera is adjusted so that the field of vision of the first camera corresponds to the field of vision of a class VI front-view device according to the Regulation UN ECE n° 46, and,
    when the vehicle speed is greater than 15 km/h, the field of vision of the first camera is adjusted so that the field of vision of the first camera covers an area that is not covered by a class VI front-view device according to the Regulation UN ECE n° 46.

2. The driver-assisting system of claim 1, wherein, when the vehicle speed is greater than 15 km/h, the field of vision of the first camera is adjusted so that the field of vision of the first camera covers an area starting from a vertical plane distant from the front of the vehicle by at least 2 meters.

3. The driver-assisting system of claim 1, wherein the control circuit is configured to receive input data from manual inputs and to modify the field of vision of the first camera in response to the input data.

4. The driver-assisting system of claim 3, wherein the manual inputs are housed in the dashboard of the vehicle.

5. The driver-assisting system of claim 1, further comprising a second camera mounted on the vehicle for viewing an area at the rear of the vehicle, the image processing circuit being operatively connected to the second camera for receiving image data from the second camera.

6. The driver-assisting system of claim 5, wherein the image processing circuit is configured to receive vehicle operating data and to selectively transmit image data of the first camera or of the second camera to the display in response to the vehicle operating data.

7. The driver-assisting system of claim 6, wherein the vehicle operating data includes position data of a gear train.

8. The driver-assisting system of claim 7, wherein the image processing circuit is configured to selectively transmit image data of the second camera to the display when the reverse gear is engaged.

9. The driver-assisting system of claim 5, wherein the image processing circuit is configured to receive input data from manual inputs and to selectively transmit image data of the first camera or of the second camera to the display in response to the input data.

10. The driver-assisting system of claim 9, wherein the manual inputs are housed in the dashboard of the vehicle.

11. The driver-assisting system of claim 1, wherein the image processing circuit is configured to modify image data of at least one of the first or second cameras depending on at least one of environmental conditions or vehicle operating data.

12. The driver-assisting system of claim 1, wherein the control circuit is configured to control an optical zoom of at least one of the first or second cameras to alter the field of vision of at least one of the first or second cameras.

* * * * *